Oct. 20, 1953

H. P. STABLER 2,656,106

SHAFT POSITION INDICATOR HAVING
REVERSIBLE COUNTING MEANS

Filed Nov. 18, 1946

INVENTOR
HOWARD P. STABLER

BY *M. O. Hayes*

ATTORNEY

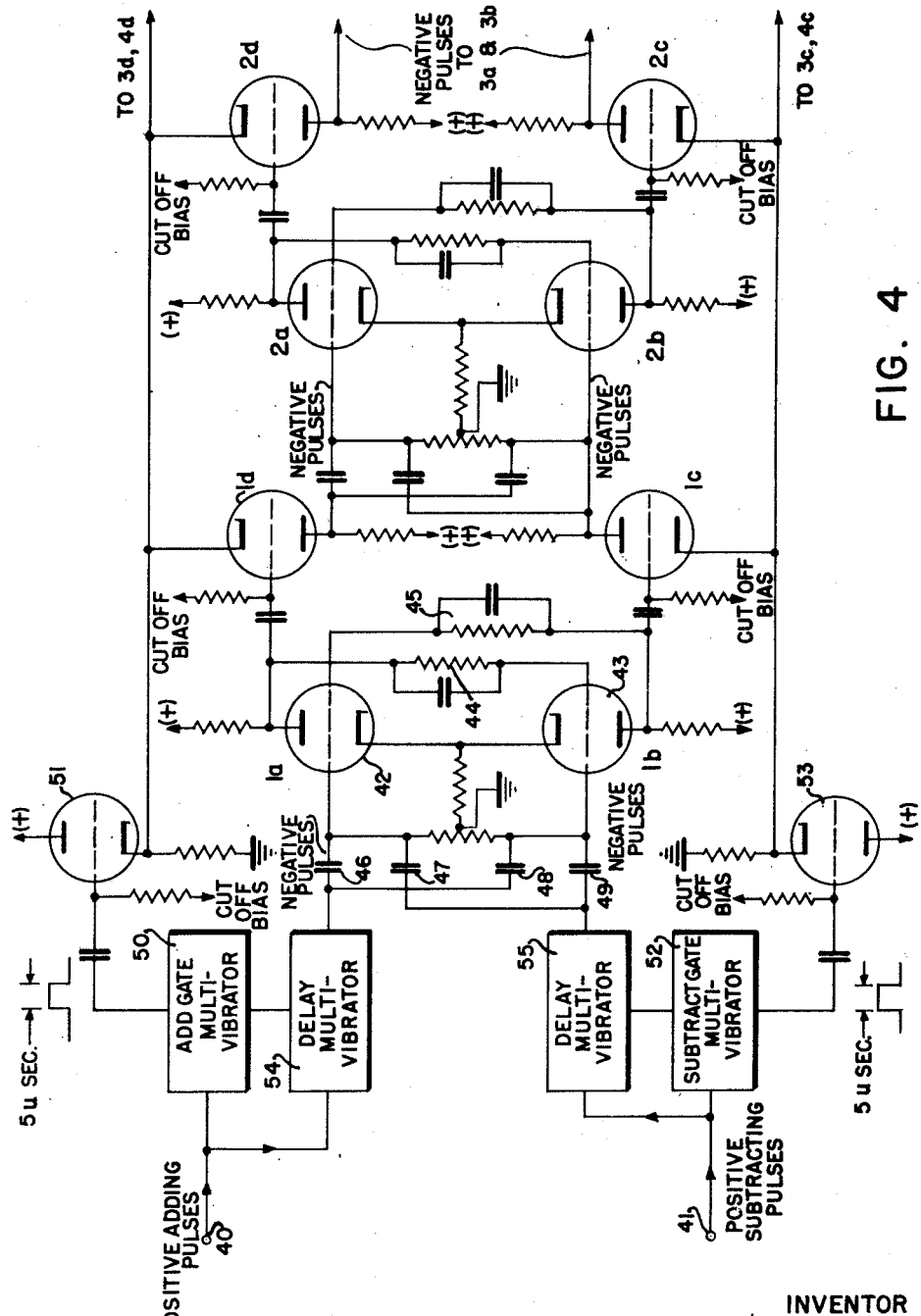

Patented Oct. 20, 1953

2,656,106

UNITED STATES PATENT OFFICE 2,656,106

SHAFT POSITION INDICATOR HAVING REVERSIBLE COUNTING MEANS

Howard P. Stabler, Williamstown, Mass., assignor, by mesne assignments, to the United States of America as represented by the Secretary of the Navy Application November 18, 1946, Serial No. 710,484

15 Claims. (Cl. 235—92)

This invention relates to computing apparatus and more particularly to an electronic shaft position indicator for use in computing apparatus.

In connection with high speed computing devices it is often necessary to have precise information about the position of a rotating shaft and to have this information continuously available in the form of a pulse wave form number. The shaft may be required to turn in either direction at irregular intervals and speeds.

The position of a shaft having unidirectional motion frequently has been indicated by the use of a conventional electronic scaling (or counting) circuit. A slotted disc is attached to the shaft and an optical system is used to produce light pulses on a phototube when the shaft rotates. The resulting electrical pulses are then counted on the scaling circuit. The number of counts so recorded is a measure of the total angular motion of the shaft from an initial zero position.

However, when it is desired to have precise information about the position of a shaft which turns in both directions at irregular intervals and speeds, the problem is somewhat more complicated. The relatively simple apparatus for adding pulses must be replaced by apparatus which will be sensitive to reversals in rotation of the shaft. Heretofore, no such system has been successfully produced for high speed computer work. It is accordingly the primary object of the present invention to provide apparatus to indicate shaft position.

It is further an object of the present invention to provide apparatus to indicate shaft position regardless of change of direction, speed, or irregularities in rotation of the shaft.

It is a further object of the present invention to provide a direction sensitive pulse generator.

It is still further an object of this invention to provide a reversible binary counter.

It is still another object of the present invention to provide a counter reading circuit which scans the several stages of the counter and gives the counter reading in the form of a pulse binary number.

These and other objects will be apparent from the following detailed description when taken with the accompanying drawings in which:

Fig. 4 is a circuit diagram of two stages of a reversible binary counter; and

Figure 1:
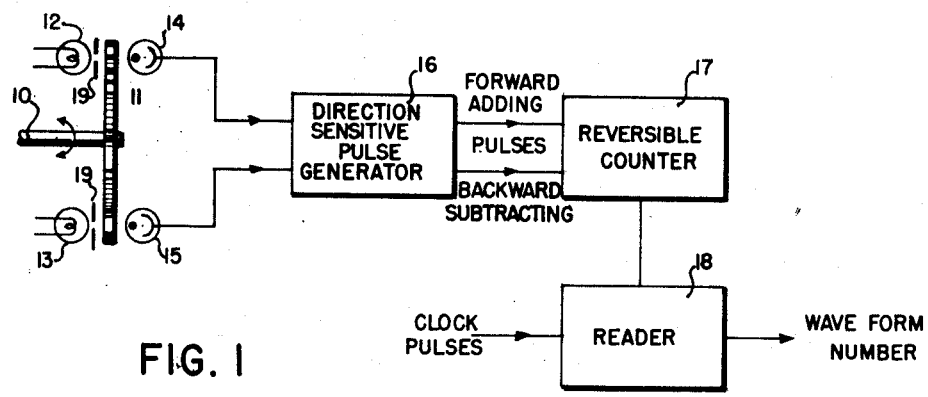
Fig. 1 is a block diagram of the shaft position indicator.
Figure 2:
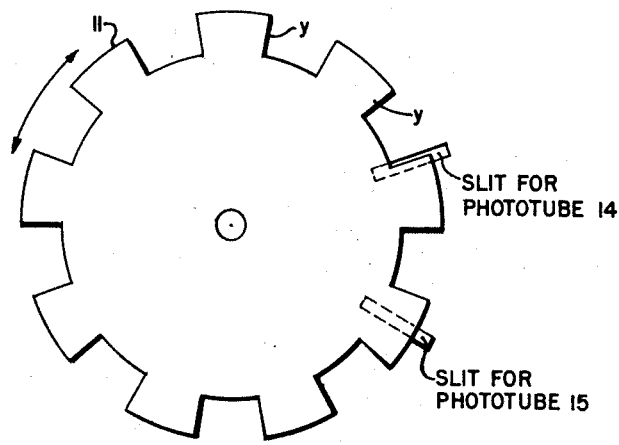
Fig. 2 is a plan view of the slotted disc of Fig. 1.

The same general approach as is used in indicating the position of a unidirectional shaft is employed in the solution of the present problem. The general overall requirements of apparatus are shown in Fig. 1. These requirements will be outlined briefly at this time, and will be subsequently discussed in greater detail in connection with other figures. Mounted on shaft 10 whose angular position is desired is slotted disc 11, a plan view of which is shown in Fig. 2. Two lamps, 12 and 13, with suitable optical systems represented by slits 19 are so disposed as to pass pulses of light through the disc as it rotates. Two phototubes 14 and 15 are necessary in order to allow the system to recognize direction of shaft rotation. The direction sensitive pulse generator 16 produces forward (or adding) pulses for forward rotation of shaft 10 and backward (or subtracting) pulses for backward rotation. One pulse is produced per disc slot and the shape of the pulse is independent of the speed of rotation of shaft 10 within certain reasonable limits. Reversible counter 17 differs from an ordinary scaling circuit in that it must account for both the addition and subtraction of pulses. The total indication at any particular instant is then a true measure of the shaft position with respect to an initial zero position. Counter circuit 17 controls a reader circuit 18. The reader responds to "clock" pulses from a synchronizing system in the computing apparatus (not shown) and produces a coded pulse wave form number corresponding to the indication of counter 17. The waveform number is transmitted to the storage system of the computing apparatus whenever the counter indication changes.

Information with respect to direction of rotation of shaft 10 is obtained by phasing the slit openings of phototubes 14 and 15 with respect to each other as shown schematically in Fig. 2. A small number of "slots" and "teeth" are shown on the periphery of disc 11, but it is of course apparent that for accurate data on the position of shaft 10, many more "slots" are required than are shown. The degree of angular subdivision possible depends upon the closeness with which practical slots can be placed, the associated inertia of the disc system, and the acceleration to which it must respond.

Assuming that the phototubes are mounted in front of disc 11 at the instant indicated in Fig. 2, phototube 14 is in transition from non-illumination to illumination for clockwise rotation of disc 11, and phototube 15 is dark. With this condition pulse generator 16 is designed to produce a forward (or adding) pulse. With counter-clockwise rotation, phototube 14 changes from illumination to non-illumination, phototube 15 is dark and a backward (or subtracting) pulse is produced. Pulse generator 16 gives no pulse for phototube 14 transitions occurring at the upper edges of the slot (such as at $y$) because the illumination of phototube 15 at these positions results in the production of a blanking signal which blanks the output of the generator.

Figure 3:
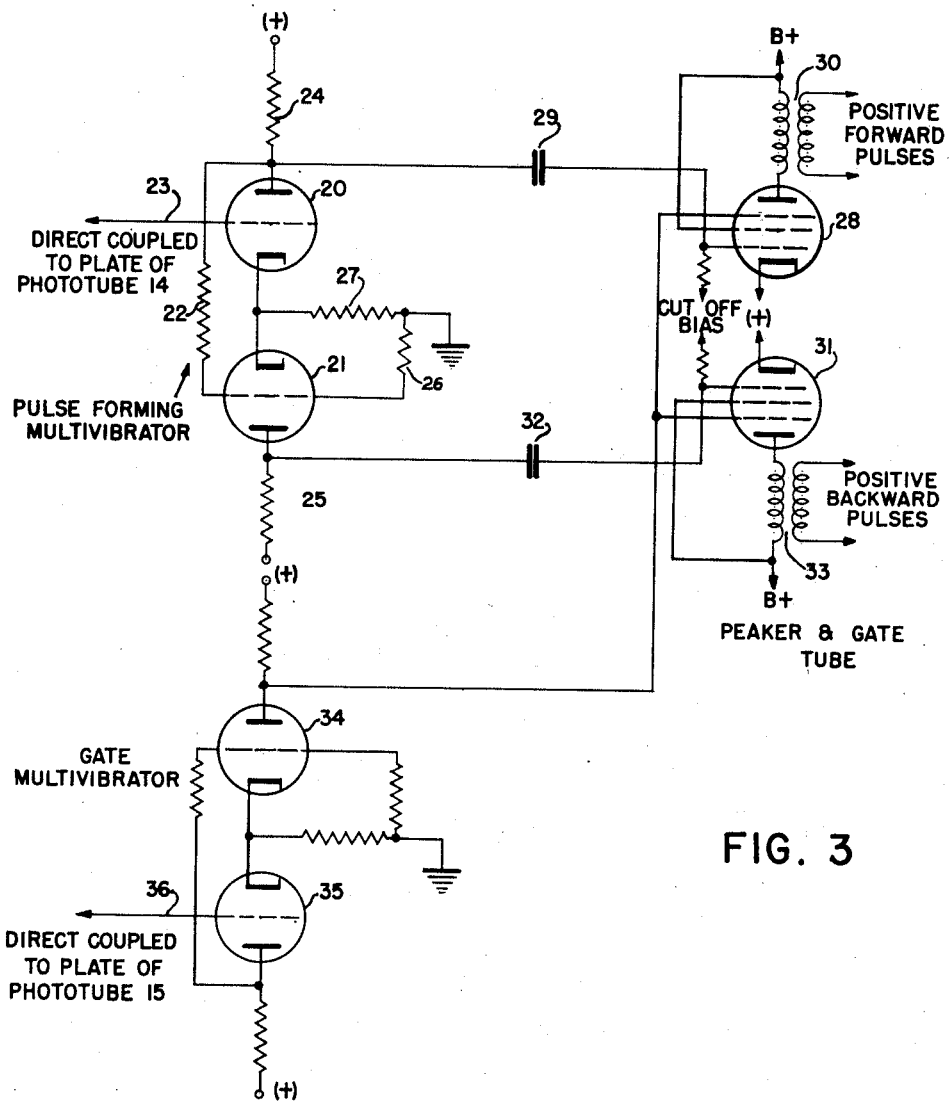
Fig. 3 is a circuit diagram of a direction sensitive pulse generator.

The essential features of pulse generator 16 are shown in the circuit diagram of Fig. 3. Triodes 20 and 21 constitute a direct coupled multivibrator, the plate of triode 20 being connected to the control grid of triode 21 through resistance 22, resulting in stability only when one or the other of the triodes is completely cut off. Grid 23 of triode 20 is direct coupled to the plate of phototube 14 (Fig. 1). The multivibrator circuit constants (resistances 22, 24, 25, 26, and 27) have been so chosen that high transition (triode 20 changing suddenly from non-conducting to conducting) occurs as the potential of grid 23 rises above 60 volts (as an exemplary value), while low transition (triode 20 changing suddenly from conducting to non-conducting) occurs as the potential of grid 23 falls below 50 volts. The sudden rise of the plate potential of triode 20 at the low transition (which occurs when phototube 14 goes from non-illumination to illumination) causes a positive pulse to appear on the control grid of pentode 28 through coupling condenser 29. If phototube 15 (Fig. 1) is dark at the time of arrival of this positive pulse, a positive pulse is also produced in the secondary of transformer 30. A similar rise in the plate potential of triode 21 at the high transition (which occurs when phototube 14 goes from illumination to non-illumination) causes a positive pulse on the control grid of pentode 31 through coupling condenser 32, and (if phototube 15 is dark) a positive pulse in the "backward" output line via transformer 33.

Triodes 34 and 35 comprise a second multivibrator identical to the one including triodes 20 and 21. The grid 36 of triode 35 is direct coupled to the plate of phototube 15. The plate of triode 34 is connected to the suppressor grids of pentodes 28 and 31. As in the case of the 20—21 multivibrator, high transition (triode 35 changing suddenly from non-conducting to conducting) occurs as the potential of grid 36 rises above 60 volts, while low transition (triode 35 changing from conducting to non-conducting) occurs as the potential of grid 36 falls below 50 volts. The sudden rise of the plate potential of triode 35 at the low transition (which occurs when phototube 15 goes from non-illumination to illumination) causes triode 34 to become conducting with a resulting drop in potential of its plate. This negative gate is applied to the suppressor grids of pentodes 28 and 31, and thus cut off these tubes when phototube 15 is illuminated. It should thus be apparent that tubes 28 and 31 can transmit pulses only if triode 34 is non-conducting, which occurs only when phototube 15 is dark.

The differential of 10 volts between the high and low transition insures that the multivibrators remain stable even if the disc 11 jitters across a transition point. Direct coupling is required between the plates of phototubes 14 and 15 and grids 23 and 36, respectively, in order to take care of very slow speed disc motion. Electron tubes 20 and 21 which are included in the pulse forming multivibrator, and tubes 34 and 35 which form the gate multivibrator are illustrated as triodes, but it will be apparent to those skilled in the art that pentodes can be substituted for improved circuit operation.

In Fig. 4 are shown two stages of a reversible binary digitary counter as represented by block 17 in Fig. 1. Positive adding pulses and positive subtracting pulses are applied to terminals 40 and 41 from the "forward" and "backward" output lines, respectively, of the direction sensitive pulse generator of Fig. 3. In each stage of the counter (of which there are a number depending upon the number of binary digits desired) $a$ and $b$ tubes are direct coupled multivibrators with components similar to those of a conventional scaling circuit. For example, in the first stage ($1a$–$1b$) triodes 42 and 43 are direct coupled in the usual manner, the plate of triode 42 being connected to the control grid of triode 43 by resistance-capacitance network 44, and the plate of triode 43 to the grid of triode 42 by resistance-capacitance network 45. Each stage is designed to respond to negative pulses and the same pulse is applied to both $a$ and $b$ control grids by reason of condensers 46, 47, 48, and 49. Conduction by an $a$ tube and non-conduction by a $b$ tube represent a zero for the corresponding binary digit. During addition, a carry-over pulse is transmitted to the next stage on the transition from $b$ conducting to non-conducting (1 to 0). This produces a positive pulse on the control grid of the $c$ tube, and a negative pulse on the $a$ and $b$ grids of the next stage. During addition, all $d$ tubes are inactivated by reason of a positive square wave generated by the "Add Gate Multivibrator" 50 and applied to the grid of triode 51. This positive gate appears at the cathode of triode 51 as well as at the cathodes of all $d$ tubes. On the other hand for subtraction, a carry-over pulse occurs on the transition from $a$ conducting to non-conducting (0 to 1) by means of the $d$ tubes. During subtraction a positive square wave generated by "Subtract Gate Multivibrator" 52 is applied to the control grid of triode 53 and all $c$ tubes are inactivated.

Two delay multivibrators 54 and 55, which are of the self-restoring type, are provided to allow time for the "Add" and "Subtract" gates to be adjusted properly before the counting pulse is received, since both the gate and the delay multivibrators are triggered by the same positive pulse. A delay of two microseconds is reasonable for this purpose. Since necessary carry-over for all stages must take place in the time interval between pulses, it is desirable that successive triggering occur rapidly. For a fourteen stage counter, the 5 microseconds indicated for the add and subtract gates is sufficient.

Figure 5:
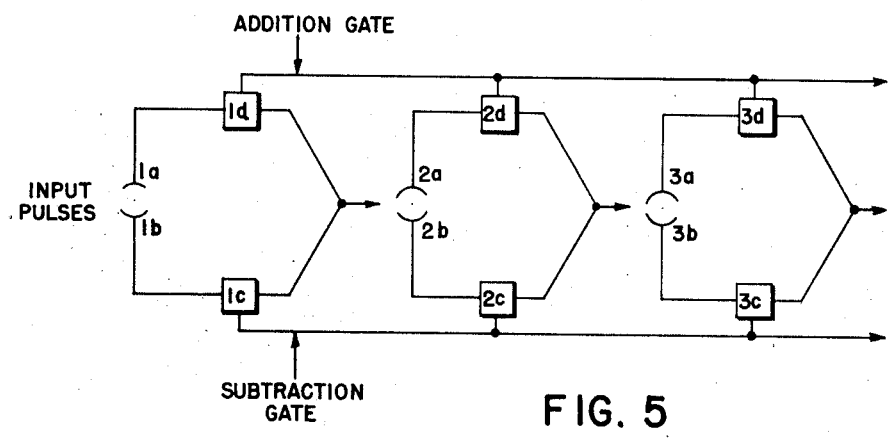
Fig. 5 is a block diagram of three stages of a reversible binary counter.

The schematic block diagram of Fig. 5 will help to clarify the overall operation of the counter circuit. As in the circuit diagram, $a$ and $b$ are triode components of an Eccles-Jordan or similar flip-flop circuit. For zero indication all $a$ tubes are conducting. The following conditions of tubes $a$ and $b$ determine the binary digit which results:

$$\left.\begin{array}{l} a \text{ non-conducting} \\ b \text{ conducting} \end{array}\right\} = 1 \qquad \left.\begin{array}{l} a \text{ conducting} \\ b \text{ non-conducting} \end{array}\right\} = 0$$

The blocks $1c$, $2c$, etc. represent triodes, which when properly gated, transmit positive carrying pulses for the transition of $b$ conducting to non-conducting (1 to 0). As previously described, this produces a positive pulse on the control grid on the c tube and a negative pulse on the a and b grids of the next stage. The blocks 1d, 2d, etc. represent triodes, which when properly gated, transmit positive carrying pulses for the transition of a conducting to non-conducting. For the system to produce the addition function, then, the transition 1 to 0 carries a pulse to the next stage; i. e., the c triodes are activated. Similarly for subtraction, the transition 0 to 1 carries a positive pulse to the next stage; i. e., the d triodes are activated. The number of stages employed is dependent upon the magnitude of the number it is desired to count.

In the foregoing discussion and as illustrated in Fig. 4, electron tube components a, b, c and d have been treated as triodes to simplify the circuit diagram and explanation of operation. For improved circuit operation, these components can all be replaced by pentodes, without departing from the spirit and scope of the invention.

The output of the counter, which is a series of pulses representing binary digits is applied to a "reader" circuit, as represented by block 18 of Fig. 1. The "reader" receives "clock" pulses from the synchronizing system of the computer (which occur at perhaps one microsecond intervals) and produce a coded pulse waveform number corresponding to the indication of the binary counter. The waveform number, in general, is applied to the storage system of the computer, and is replaced whenever the counter indication changes. This pulse energy then represents the position of the subject shaft, and is combined with other inputs to the overall computer system to solve the problem at hand. The method of combination will be understood by those familiar with the art, and will not be considered at this time.

While the pulse generator and reversible counter have been considered primarily in connection with shaft position indication, the principles disclosed herein can be used for other situations involving two-directional motion and differential counting. For instance, the method should be useful for counting interference fringe changes caused by the motion of an interferometer mirror. Accordingly, the foregoing discussion should not be construed as a definition of the invention, but merely illustrative of one form the invention may take. The spirit and scope of the invention are intended to be limited only by the appended claims.

What is claimed is:

1. Apparatus for indicating the position of a rotating shaft with reference to an initial zero position comprising, a slotted disc mounted on said shaft, two light sensitive tubes with associated light sources being so disposed about said disc to produce two series of pulse outputs as said shaft rotates, said two series of pulses being relatively displaced in time in accordance with the direction of rotation of said shaft a pulse generator responsive to said series of pulses from said light sensitive tubes to produce direction sensitive pulses in accordance with the direction of rotation of said shaft, and a reversible counting circuit adapted to add and subtract said direction sensitive pulses.

2. Apparatus for indicating the position of a rotating shaft with respect to an initial zero position comprising, a slotted disc mounted on said shaft, two light sources disposed on one side of said disc, two light sensitive tubes similarly disposed on the other side of said disc, said light sources and said light sensitive tubes being so positioned with respect to the slots in said disc to produce direction sensitive signals as said shaft rotates, a pulse generator biased by the output signals from said light sensitive tubes to produce direction sensitive voltage pulses in accordance with the rotation of said shaft, and a reversible binary counter being adapted to add and subtract said pulses in the binary number system to indicate angular motion of said shaft.

3. Apparatus for indicating the direction of rotation of a shaft comprising, a slotted disc mounted on said shaft, first and second light sources disposed on one side of said disc, first and second light sensitive tubes similarly disposed on the other side of said disc, an electrically energized counter and control circuit therefor including a direction sensitive pulse generator comprising a pulse forming multivibrator, a gate multivibrator, and first and second amplifier tubes, said pulse forming multivibrator being directly connected to the plate of said first light sensitive tube, and said gate forming multivibrator being directly connected to the plate of said second light sensitive tube, the output of said pulse forming multivibrator being electrically coupled to each of said first and second amplifier tubes, the output of said gate multivibrator being coupled to bias both of said first and second amplifier tubes, whereby the output of said first amplifier tube is a positive pulse when said first light sensitive tube is in transition between illuminated to non-illuminated and the output of said second amplifier tube is a positive pulse when said first light sensitive tube is in transition between non-illuminated and illuminated, there being no output from either of said amplifier tubes when said second light sensitive tube is illuminated.

4. Apparatus for indicating the angular position of a rotating shaft with reference to an initial position comprising, means for producing a first series of pulses and a second series of pulses having a relative time of occurrence dependent on direction of rotation of said shaft, each of said pulses representing a predetermined angular increment of rotation, an indicator and control circuit therefor, a driven multivibrator having two electron tubes, one biased to be normally conducting while the second is normally nonconducting, means coupling said first series of pulses to said multivibrator to shift the state of conduction therein for the duration of said pulses, a square wave gate generator responsive to said second series of pulses to produce an output voltage square wave, a two-channel amplifier coupled to said multivibrator and normally biased to nonconduction, means applying said voltage square wave to bias said amplifier to conduction for the duration of the positive portion of said voltage square wave, whereby relative time of occurrence of said two series of pulses controls the time of conduction of said amplifier to produce selective separation of pulses into one of said two output channels for application to said control circuit in accordance with the state of the conduction of said multivibrator.

5. Apparatus for indicating the angular position of a rotating shaft with reference to an initial position comprising, means for producing a first series of pulses and a second series of pulses having a relative time of occurrence dependent on direction of rotation of said shaft, each of said pulses representing a predetermined angular increment of rotation, a driven multivibrator having two electron tubes, one biased to be normally conducting while the second is normally nonconducting, means coupling said first series of pulses to said multivibrator to shift the state of conduction therein for the duration of said pulses, a square wave gate generator responsive to said second series of pulses to produce an output voltage square wave, a two-channel amplifier coupled to said multivibrator and normally biased to nonconduction, means applying said voltage square wave to bias said amplifier to conduction for the duration of the positive portion of said voltage square wave, whereby relative time of occurrences of said two series of pulses controls the time of conduction of said amplifier to produce selective separation of pulses into one of said two channels in accordance with the state of the conduction of said multivibrator, and a reversible binary counter responsive to output pulses of each channel of said amplifier to add or subtract said pulses in accordance with the direction of rotation of said shaft.

6. Apparatus for indicating the angular position of a rotating shaft with reference to an initial position comprising, a disc having radial slots mounted on said shaft, first and second light sources positioned in spaced angular relationship on one side of said disc, first and second light sensitive tubes similarly positioned on the other side of said disc, an electrically energized counter a pulse generator responsive to said first light sensitive tube to produce output pulses at each change of illumination of said tube, a two-channel amplifier connected to said counter, coupled to said pulse generator and biased to be normally conductive, and means applying the output of said second light sensitive tube to bias said amplifier to nonconduction when said second light sensitive tube is illuminated, whereby the relative time of occurrence of illumination of said first and second light sensitive tubes through said slots selectively controls the channel of said amplifier which transmits pulses in accordance with the direction of rotation of said shaft.

7. Apparatus for indicating the angular position of a rotating shaft with reference to an initial position comprising, a disc having radial slots mounted on said shaft, first and second light sources positioned in spaced angular relationship on one side of said disc, first and second light sensitive tubes similarly positioned on the other side of said disc, a pulse generator responsive to said first light sensitive tube to produce output pulses at each change of illumination of said tube, a two-channel amplifier coupled to said pulse generator and biased to be normally conductive, means applying the output of said second light sensitive tube to bias said amplifier to nonconduction when said light sensitive tube is illuminated, whereby the relative time of occurrence of illumination of said first and second light sensitive tubes through said slots selectively controls the channel of said amplifier which transmits pulses in accordance with the direction of rotation of said shaft, and a reversible binary counter responsive to output pulses of each channel of said amplifier to add or subtract said pulses in accordance with the direction of rotation of said shaft.

8. Apparatus for indicating the angular position of a rotating shaft with reference to an initial position comprising, a disc having radial slots mounted on said shaft, first and second light sources and first and second phototubes so positioned with respect to the slots of said disc that direction of rotation of said disc determines the sequence of illumination of said phototubes, an electrically energized counter, a driven multivibrator responsive to the output of said first phototube to produce first and second series of voltage pulses as the illumination of said first phototube is increased and decreased respectively, first and second amplifier channels connected to said counter and responsive to said first and second series of pulses respectively, said amplifier channels being biased to be normally conductive, and a control circuit for said first and second amplifier channels responsive to the output of said second phototube for biasing said amplifier channels to nonconduction when said second phototube is illuminated whereby said first and second channels respectively transmit pulses in accordance with the direction of rotation of said shaft.

9. Apparatus for indicating the angular position of a rotating shaft with reference to an initial position comprising, a disc having radial slots mounted on said shaft, first and second light sources and first and second phototubes so positioned angularly with respect to the slots of said disc that direction of rotation of said disc determines the sequence of illumination of said phototubes, a driven multivibrator responsive to the output of said first phototube to produce first and second series of voltage pulses as the illumination of said first phototube is increased and decreased respectively, first and second amplifier channels responsive to said first and second series of pulses respectively, said amplifier channels being biased to be normally conductive, a control circuit for said first and second amplifier channels responsive to the output of said second phototube for biasing said amplifier channels to nonconduction when said second phototube is illuminated, whereby said first and second channels respectively transmit pulses in accordance with the direction of rotation of said shaft, and a reversible binary counter responsive to output pulses of each channel of said amplifier to add or subtract said pulses in accordance with the direction of rotation of said shaft.

10. Apparatus for indicating the angular position of a rotating shaft with reference to an initial position comprising, a disc having radial slots mounted on said shaft, first and second light sources and first and second phototubes, said light sources and said phototubes being positioned angularly with respect to the slots of said disc so that direction of rotation of said disc determines the sequence of illumination of said phototubes, an electrically energized counter, a pulse generator responsive to the output of said first phototube to produce first and second series of voltage pulses in response to changes of illumination of said first phototube, first and second amplifier channels connected to said counter and responsive to said first and second series of pulses respectively, said amplifier channels being biased to be normally conductive, and a control circuit for said first and second amplifier channels responsive to the outpot of said second phototobe for biasing said amplifier channels to nonconduction when said second phototobe is illuminated whereby said first and second channels respectively transmit pulses in accordance with the direction of rotation of said shaft.

11. Apparatus for indicating the angular position of a rotating shaft with reference to an initial position comprising, a disc having radial slots mounted on said shaft, first and second light sources and first and second phototubes, said light sources and said phototubes being positioned angularly with respect to the slots of said disc so that direction of rotation of said disc determines the sequence of illumination of said phototubes, a pulse generator responsive to the output of said first phototube to produce first and second series of voltage pulses in response to changes of illumination of said first phototube, first and second amplifier channels responsive to said first and second series of pulses respectively, said amplifier channels being biased to be normally conductive and a control circuit for said first and second amplifier channels responsive to the output of said second phototube for biasing said amplifier channels to nonconduction when said second phototube is illuminated whereby said first and second channels respectively transmit pulses in accordance with the direction of rotation of said shaft, and a reversible binary counter responsive to said amplifier output pulses to add or subtract said pulses in accordance with the direction of rotation of said shaft.

12. Apparatus for indicating the angular position of a rotating shaft with reference to an initial position comprising, a disc having radial slots mounted on said shaft, first and second light sources positioned on one side of said disc, first and second phototubes similarly positioned on the other side of said disc, said light sources and said phototubes being so spaced angularly with respect to the slots of said disc that direction of rotation of said disc determines the sequence of illumination of said phototubes, an electrically energized counter, a pulse generator responsive to the output of said first phototube to produce first and second series of voltage pulses, each positive pulse of said first series occurring at an increase of illumination of said first phototube and each positive pulse of said second series occurring at a decrease of illumination of said first phototube, first and second amplifier channels connected to said counter and responsive to said first and second series of pulses respectively, said amplifier channels being biased to be normally conductive and a control circuit for said first and second amplifier channels responsive to the output of said second phototube for biasing said amplifier channels to nonconduction when said second phototube is illuminated whereby said first and second channels respectively transmit pulses in accordance with the direction of rotation of said shaft.

13. Apparatus for indicating the angular position of a rotating shaft with reference to an initial position comprising, a disc having radial slots mounted on said shaft, first and second light sources positioned on one side of said disc, first and second phototubes similarly positioned on the other side of said disc, said light sources and said phototubes being so spaced angularly with respect to the slots of said disc that direction of rotation of said disc determines the sequence of illumination of said phototubes, a pulse generator responsive to the output of said first phototube to produce first and second series of voltage pulses, each positive pulse of said first series occurring at an increase of illumination of said first phototube and each positive pulse of said second series occurring at a decrease of illumination of said first phototube, first and second amplifier channels responsive to said first and second series of pulses respectively, said amplifier channels being biased to be normally conductive and a control circuit for said first and second amplifier channels responsive to the output of said second phototube for biasing said amplifier channels to nonconduction when said second phototube is illuminated whereby said first and second channels respectively transmit pulses in accordance with the direction of rotation of said shaft, and a reversible binary counter responsive to said amplifier output pulses to add or subtract said pulses in accordance with the direction of rotation of said shaft.

14. A reversible binary digital counter for adding pulses from a first source and subtracting pulses from a second source to yield a differential count including a plurality of counting stages, each of said stages comprising a driven multivibrator including first and second electron tubes, nonconduction of said first tube and conduction of said second tube representing one in the binary number system and conduction of said first tube and nonconduction of said second tube representing zero in the binary number system, third and fourth electron tubes normally biased to conduction, the output of said first electron tube being applied to said third electron tube, and the output of said second electron tube being applied to said fourth electron tube, means responsive to pulses from said first source to generate an add gate, means responsive to pulses from said second source to generate a subtract gate, means for applying said add gate to bias said third electron tube to nonconduction, means for applying said subtract gate to bias said fourth electron tube to nonconduction, and means for applying pulses from said first and second sources to trigger said multivibrator of the first of said stages whereby the transition of said first electron tube from conduction to nonconduction occurring simultaneously with said subtract gate permits said third electron tube to transmit a subtracting pulse to the next of said plurality of stages, and the transition of said second tube from conduction to nonconduction occurring simultaneously with said add gate permits said fourth electron tube to transmit an add pulse to the next of said plurality of stages.

15. A reversible binary digital counter for adding pulses from a first source and subtracting pulses from a second source to yield a differential count including a plurality of counting stages, each of said stages comprising a driven multivibrator including first and second electron tubes, nonconduction of said first tube and conduction of said second tube representing one in the binary number system and conduction of said first tube and nonconduction of said second tube representing zero in the binary number system, third and fourth electron tubes normally biased to conduction, the output of said first electron tube being applied to said third electron tube, and the output of said second electron tube being applied to said fourth electron tube, means responsive to pulses from said first source to generate an add gate, means responsive to pulses from said second source to generate a subtract gate, means for applying said add gate to bias said third electron tube to nonconduction, means for applying said subtract gate to bias said fourth electron tube to nonconduction, first and second delay means, and means for applying pulses from said first and second sources through said first and second delay means respectively to trigger said multivibrator of the first of said stages, whereby the transition of said first electron tube from conduction to nonconduction occurring simultaneously with said subtract gate permits said third electron tube to transmit a subtracting pulse to the next of said plurality of stages, and the transition of said second tube from conduction to nonconduction occurring simultaneously with said add gate permits said fourth electron tube to transmit an add pulse to the next of said plurality of stages.

H. P. STABLER.

References Cited in the file of this patent

UNITED STATES PATENTS

| Number | Name | Date |
|---|---|---|
| 1,743,175 | Wensely et al. | Jan. 14, 1930 |
| 2,091,562 | Palmer | Aug. 31, 1937 |
| 2,411,613 | Bryant | Nov. 26, 1946 |
| 2,420,590 | Everhart | May 13, 1947 |
| 2,428,990 | Rajchman | Oct. 14, 1947 |
| 2,438,492 | Bascom | Mar. 30, 1948 |
| 2,462,275 | Morton | Feb. 22, 1949 |
| 2,462,292 | Snyder | Feb. 22, 1949 |
| 2,483,394 | Barker | Oct. 4, 1949 |
| 2,514,036 | Dickinson | July 4, 1950 |
| 2,525,077 | Morton | Oct. 10, 1950 |
| 2,534,287 | Marsh | Dec. 19, 1950 |